US010330355B2

(12) United States Patent
Park et al.

(10) Patent No.: US 10,330,355 B2
(45) Date of Patent: Jun. 25, 2019

(54) HEAT PUMP HEATING-COOLING SYSTEM USING HYBRID HEAT SOURCE AND CONTROL METHOD THEREOF

(71) Applicants: SINJIN ENERTEC CO., LTD., Jeongju-si, Jeollabuk-do (KR); Jin Sup Park, Muju-gun (KR)

(72) Inventors: Jin Sup Park, Muju-gun (KR); Sang Myun Park, Jeonju-si (KR)

(73) Assignees: SINJIN ENERTEC CO., LTD, Jeonju-si, Jeollabuk-do (KR); Jin Sup Park, Muju-gun (KR)

( * ) Notice: Subject to any disclaimer, the term of this patent is extended or adjusted under 35 U.S.C. 154(b) by 0 days.

(21) Appl. No.: 15/323,086

(22) PCT Filed: Nov. 26, 2014

(86) PCT No.: PCT/KR2014/011413
§ 371 (c)(1),
(2) Date: Dec. 29, 2016

(87) PCT Pub. No.: WO2016/003028
PCT Pub. Date: Jan. 7, 2016

(65) Prior Publication Data
US 2017/0131005 A1    May 11, 2017

(30) Foreign Application Priority Data
Jul. 1, 2014   (KR) .................. 10-2014-0081632

(51) Int. Cl.
*F25B 30/06* (2006.01)
*F25B 25/00* (2006.01)
(Continued)

(52) U.S. Cl.
CPC ............ *F25B 30/06* (2013.01); *F24F 5/0046* (2013.01); *F25B 25/005* (2013.01);
(Continued)

(58) Field of Classification Search
CPC ...... F24F 5/0046; F25D 21/002; F25B 30/06; F25B 49/02
See application file for complete search history.

(56) References Cited

U.S. PATENT DOCUMENTS

| 2,438,720 A | * | 3/1948 | Smith ................ E21B 36/00 159/902 |
| 2008/0203179 A1 | * | 8/2008 | Berger ............... F24D 3/08 237/19 |
| 2010/0043461 A1 | * | 2/2010 | Pan .................. F24F 1/022 62/79 |

FOREIGN PATENT DOCUMENTS

| JP | 2008-241203 A | 10/2008 |
| KR | 20120052204 A | * 5/2012 |

(Continued)

OTHER PUBLICATIONS

Bark, Heat Pump Apparatus for Heating and Cooling . . . , May 23, 2012, KR20120052204A, Whole Document.*

(Continued)

*Primary Examiner* — Larry L Furdge
(74) *Attorney, Agent, or Firm* — MH2 Technology Law Group, LLP (57) ABSTRACT

Disclosed is a heat pump heating/cooling system that uses a hybrid heat source that may include air heat, groundwater heat, brine and in-line heaters. The heat pump includes 1) a device for compressing, condensing, gasifying, and circulating cooling/heating media and exchanging heat with water refrigerant; 2) a device for storing heat energy in a storage tank; 3) a device for loading a load through a four-way fan coil unit; and 4) a control panel. To remove frost on the exterior of an evaporator, the evaporator is temporarily stopped, and brine at a temperature of 15° C. to 20° C., which receives groundwater heat from a brine heat exchanger and receives heat from an in-line heater, is (Continued)

supplied to a brine supply pipe installed around the evaporator to melt and remove the frost on the exterior of the evaporator and then is discharged at a temperature of −3° C. to 5° C.

7 Claims, 11 Drawing Sheets (51) Int. Cl.
    *F24F 5/00*     (2006.01)
    *F25B 49/02*     (2006.01)
    *F25D 21/00*     (2006.01)
    *F25B 47/02*     (2006.01)

(52) U.S. Cl.
    CPC ............ *F25B 47/025* (2013.01); *F25B 49/02* (2013.01); *F25D 21/002* (2013.01); *F25B 2339/047* (2013.01); *F25B 2341/0662* (2013.01); *F25B 2400/13* (2013.01); *F25B 2700/11* (2013.01); *F25B 2700/197* (2013.01); *F25B 2700/2106* (2013.01); *F25B 2700/21174* (2013.01); *F25B 2700/21175* (2013.01); *Y02B 10/40* (2013.01)

(56) References Cited

FOREIGN PATENT DOCUMENTS

| KR | 10-2012-0056180 A | 6/2012 |
|----|-------------------|--------|
| KR | 10-2013-0031596 A | 3/2013 |
| KR | 10-1351826 B1     | 1/2014 |

OTHER PUBLICATIONS

International Search Report dated Mar. 20, 2015, International Application No. PCT/KR2014/011413, pp. 1-4 (including English Translation).

* cited by examiner

HEAT PUMP HEATING-COOLING SYSTEM USING HYBRID HEAT SOURCE AND CONTROL METHOD THEREOF

This is a U.S. national phase application of Int'l Appl. No. PCT/KR2014/011413 filed on Nov. 26, 2014, which claims priority to Korean Patent Application No. 10-2014-0081632 filed on Jul. 1, 2014, the contents of both of which are incorporated herein by reference.

TECHNICAL FIELD

The present invention relates to a heat pump heating-cooling system using a hybrid heat source as well as a method for controlling it. More particularly, the present invention relates to a heat pump heating-cooling system for defrosting the evaporator efficiently using a hybrid heat source including an air heat, a ground water heat, a brine heat and an inline heater as well as a method for controlling the heat pump heating-cooling system.

DESCRIPTION OF PRIOR ART

Generally, the heat pump has been used for performing both heating and cooling in a single device. Further, in a heat pump, both heating and cooling can be made using condensation heat and/or evaporation heat of refrigerant by transferring the thermal energy from low temperature heat source to ambient high temperature space, or from high temperature heat source to ambient low temperature space.

Therefore, the circulation and/or the heat exchange of refrigerant can make the heat pump to be applied for heating-cooling the ambient space through the heat exchange at loading place. When the heat pump has been used as heating device in winter, the heating can be provided by heat exchange in condensation step, during the circulation of 4 cycling steps, those are, the compression of refrigerant, the condensation and heat exchange, the expansion and the evaporation. For operating the heat pump system, a compressor, a condenser as heat exchanger, an expansion valve and an evaporator as heat exchanger have been required.

The 4 cycling steps in the heat pump can be explained as follows. In the compressor, the low temperature vapor phase refrigerant has been compressed into high temperature and high pressure vapor phase refrigerant. After transferring it to the condenser, the compressed refrigerant has been condensed by heat exchange of ambient air or heat transfer. After heat exchange in the condenser, the phase of refrigerant has been converted into liquid phase. At the expansion valve, the flow of liquid phase refrigerant has been adjusted and sprayed into the evaporator. Then, the refrigerant has been evaporated with absorption of ambient thermal energy. Therefore, the evaporation of refrigerant has resulted in the cooling of ambient space, which can cause the generation of frost outside surface of the evaporator. Finally, the low temperature vapor phase of refrigerant from the evaporator has been introduced into the compressor, where the cycling steps have been re-started and repeated.

In the cycling steps of cooling, the outside surface temperature of evaporator becomes lower, because the ambient thermal energy is absorbed for evaporation. Further, it also causes the formation of frost converted from the moisture attached to the outside of evaporator.

The frost generated outside surface of evaporator has become gradually thicker by the lapse of time, which causes the decline of heat exchange efficiency of evaporator. Therefore, heat pump system requires excessive power consumption.

The basic structure and mechanism of heat pump heating-cooling system for supplying heating-cooling to the green house has been disclosed in our previous Korean Patent No. 10-1351826 entitled to 'Heat pump apparatus for heating and cooling using ground water for green house'.

The structure and mechanism of heat pump heating-cooling system for green house disclosed in this patent can be explained as follows.

The heat pump heating-cooling system for green house can comprise following 4 elemental parts of:

1) a thermal energy source part for generating and transferring the thermal energy via the water-refrigerant heat exchanger (b) to a heat storage part, wherein a thermal energy source part comprises a compressor (a) for compressing the refrigerant, a condenser and water-refrigerant heat exchanger (b) for transferring the thermal energy to a heat storage part, an evaporator (d) for adjusting the temperature of refrigerant;

2) a heat storage part containing a heat storage tank (c), wherein the thermal energy form a thermal energy source part is supplied and stored through the water-refrigerant heat exchanger (b) and the water is used as heat storage medium;

3) a second heat exchange part between a heat storage part and a heat loading part, wherein the second heat exchange is made to afford the thermal energy to the heat loading part in the second heat exchanger (f); and 4) a heat loading part to afford the heating to the loading place of green house.

In this heat pump system, to adjust and control the thermal energy of a water-refrigerant heat exchanger (b) through the condenser and heat exchanger (c), the thermal energy of ground water can be provided. Further the temperature of heat storage tank (e) has to be controlled at 60~90° C. at the time of heating the greenhouse, and at 8~13° C. at the time of cooling the greenhouse.

Since the supply of thermal energy has been made by heat exchange of thermal energy of only air and ground water, the thermal energy may not be enough to operate this heat pump system.

On the other hand, since any defrost apparatus and/or function has not been provided in this heat pump system, the operation of heat pump system has to be suspended for defrosting the evaporator. In other words, for defrosting the evaporator, the circular operation has to be changed in a reverse-direction to afford the thermal energy around the evaporator.

To overcome the problems of conventional heat pump system, the inventors of present invention have developed a new heat pump heating-cooling system using hybrid heat sources of air, ground water, brine and inline heater, which can defrost the evaporator by operation control system having a frost detection sensor. When the frost has been detected by the frost detection sensor, the thermal energy of brine can be supplied into the brine supplying pipes arranged with evaporation pipes in zigzag style for removing the frost in the fins of evaporator. Further, the thermal energy of brine can be supplied by hybrid heat sources of air, ground water, brine and inline heater for removing the frost. Further, the freezing temperature of brine may be at −30 ~−15° C. for appropriate thermal energy transfer. Finally, the present invention can provide the heat pump heating-cooling system using hybrid heat sources for effectively defrosting the evaporator by operation control system without suspension of the circular operation for defrost.

Problem to be Solved

The problem to be solved is to develop a new heat pump heating-cooling system using hybrid heat sources of air, ground water, brine and inline heater, which can defrost the evaporator by the control panel having a frost detection sensor. Further, the present invention is to develop a heat pump heating-cooling system using hybrid heat sources for effectively defrosting the evaporator by the control panel without suspension of the circular operation. When the frost has been detected by a frost detection sensor, it has been designed that the heated brine can be supplied into the brine supplying pipes arranged with evaporation pipes in zigzag style for removing the frost outside of evaporation pipes. Further, the thermal energy of brine can be supplied by hybrid heat sources of air, ground water, brine and inline heater for removing the frost. Further, the freezing temperature of brine may be preferred at −30~−15° C. for appropriate thermal energy transfer.

Means for Solving the Problem

The object of present invention is to provide a heat pump heating-cooling system using hybrid heat sources of air, ground water, brine and inline heater, comprising:

1) a circulating energy source part for generating and transferring the thermal energy through the water-refrigerant heat exchanger (B) into a heat storage part, wherein a circulating energy source part comprises a compressor (A) for compressing the refrigerant, a condenser and water-refrigerant heat exchanger (B) for transferring the thermal energy into a heat storage part, a brine supplying pipe (C) for supplying thermal energy for both evaporation and defrost and an evaporator (D) for evaporating the refrigerant;

2) a heat storage part containing a heat storage tank (E), wherein the thermal energy from a circulating energy source part is supplied and stored in water medium;

3) a heat loading part to afford the heating to the green house through 4-way fan coil unit (F), wherein the thermal energy in heated water is exchanged and released from fan coil unit; and 4) a control panel (10) for controlling the operation conditions of normal and/or defrost mode operation;

wherein 11~14° C. of brine is supplied to the brine supplying pipe (C) to afford the evaporation thermal energy, −3~5° C. of brine is collected and 8~14° C. of brine is re-supplied and circulated after heat exchange with ground water in a brine heat exchanger (20).

The other object of present invention is to provide a heat pump heating-cooling system using hybrid heat sources of air, ground water, brine and inline heater, comprising:

1) a circulating energy source part for generating and transferring the thermal energy through the water-refrigerant heat exchanger (B) into a heat storage part, wherein a circulating energy source part comprises a compressor (A) for compressing the refrigerant, a condenser and water-refrigerant heat exchanger (B) for transferring the thermal energy into a heat storage part, a brine supplying pipe (C) for supplying thermal energy for both evaporation and defrost and an evaporator (D) for evaporating the refrigerant;

2) a heat storage part containing a heat storage tank (E), wherein the thermal energy from a circulating energy source part is supplied and stored in water medium;

3) a heat loading part to afford the heating to the green house through 4-way fan coil unit (F), wherein the thermal energy in heated water is exchanged and released from fan coil unit; and 4) a control panel (10) for controlling the operation conditions of normal and/or defrost mode operation;

wherein, for defrost operation, the operation of evaporator (D) is temporally suspended, 15~20° C. of brine heated by both the ground water heat through a brine heat exchanger (20) and the inline heater (40) heat is provided to the brine supplying pipe (C) installed in surroundings of evaporator to remove the frost outside of evaporator, and −3~5° C. of brine is discharged after defrost.

Further, the normal mode or defrost mode of operation can be decided by processing the data measured by a frost detection sensor, a temperature sensor, a pressure sensor and/or a gauge sensor in the control panel (10), after initial detection of the frost by the frost detection sensor.

In addition, the brine supplying pipes and the evaporation pipes have been arranged to be mixed each other in zigzag style and the fins have been equipped in equal spacing distance outside of brine supplying pipes and evaporation pipes for efficient heat exchange, wherein the 11~14° C. of brine is supplied to afford the evaporation heat during heating operation and 8~14° C. of brine is supplied to absorb the liquefaction heat during cooling operation.

The freezing point of brine is −30~−15° C. and the brine is mixed solution of water and anhydrous ethanol (1:1 v/v).

Advantageous Effect

The advantageous effect of present invention is to provide a new heat pump heating-cooling system using hybrid heat sources of air, ground water, brine and inline heater, which can defrost the evaporator by the control panel having a frost detection sensor. Further, the present invention is to provide a heat pump heating-cooling system using hybrid heat sources for effectively defrosting the evaporator by the control panel without suspension of the circular operation. When the frost has been detected by a frost detection sensor, it has been designed that heated brine can be supplied into the brine supplying pipes arranged with evaporation pipes in zigzag style for removing the frost outside of evaporation pipes. Further, the thermal energy of brine can be supplied by hybrid heat sources of air, ground water, brine and inline heater for removing the frost. Further, the freezing temperature of brine may be preferred at −30~−15° C. for appropriate thermal energy transfer.

BRIEF DESCRIPTION OF DRAWINGS

The additional heat exchange made between 11~14° C. of ground water and 20° C. of cooling water has been made at the ground water heat exchanger (50) to supplement the cooling at loading place for cooling operation.

For heating operation, the liquid phase of refrigerant has been introduced to the evaporator and low temperature vapor phase refrigerant has been made after evaporation. To supply the evaporation heat, 11~14° C. of brine is supplied and −3~5° C. of brine is collected after supplying evaporation heat. The low temperature of brine has to be heat exchanged with ground water at a brine heat exchanger.

On the other hand, for cooling operation, the vapor phase of refrigerant has been introduced to the evaporator and high temperature liquid phase refrigerant has been made after liquefaction. The supplied brine can absorb the liquefaction heat from the evaporator.

For heating operation, the liquid phase of refrigerant has been introduced to the evaporator and low temperature vapor phase refrigerant has been made after evaporation. To supply the evaporation heat, 11~14° C. of brine is supplied and −3~5° C. of brine is collected after supplying evaporation heat. The low temperature of brine has to be heat exchanged with ground water at a brine heat exchanger.

On the other hand, for cooling operation, the vapor phase of refrigerant has been introduced to the evaporator and high temperature liquid phase refrigerant has been made after liquefaction. The supplied brine can absorb the liquefaction heat from the evaporator.

In FIG. 4A, the bright color shows the pipe structure of evaporating pipes for refrigerant circulation and the dark color shows the pipe structure of brine supplying pipes for brine circulation. The inlet and outlet of refrigerant have been equipped to the outside of evaporator.

In FIG. 4B, the bright color shows the pipe structure of evaporating pipes for refrigerant circulation and the dark color shows the pipe structure of brine supplying pipes for brine circulation. The inlet and outlet of brine have been equipped to the outside of evaporator.

In FIG. 4C, the outside surrounding pipes shows the evaporating pipes for refrigerant circulation and the inside core pipes shows the brine supplying pipes for brine circulation.

PREFERRED EMBODIMENT OF INVENTION

The present invention relates to a heat pump heating-cooling system using hybrid heat sources of air, ground water, brine and inline heater, comprising:

1) a circulating energy source part for generating and transferring the thermal energy through the water-refrigerant heat exchanger (B) into a heat storage part;

2) a heat storage part containing a heat storage tank (E);

3) a heat loading part to afford the heating to the green house through 4-way fan coil unit (F); and 4) a control panel (10) for controlling the operation conditions of normal and/or defrost mode operation: wherein, for defrost operation, 15~20° C. of brine heated by both the ground water heat from a brine heat exchanger (20) and the inline heater (40) heat is provided to the brine supplying pipe (C) installed in surroundings of evaporator, and −3~5° C. of brine is collected after defrost.

The present invention can be explained more specifically in reference to attached drawings.

Figure 1:
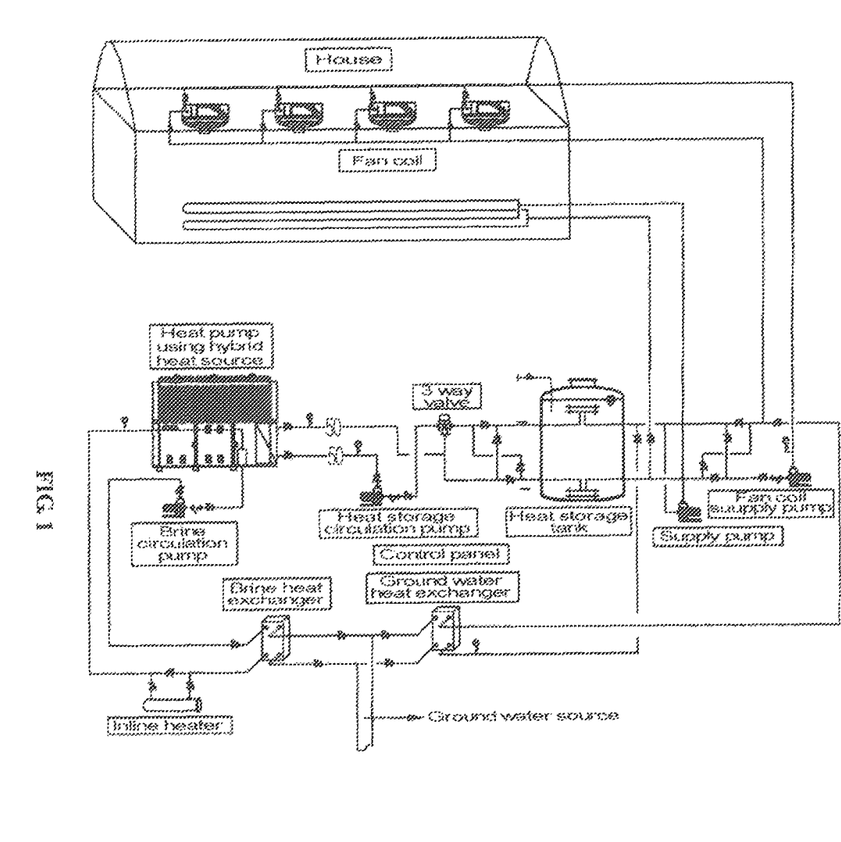
FIG. 1 is a schematic view showing the overall arrangement of the heat pump heating-cooling system using a hybrid heat source in the present invention.

FIG. 1 is a schematic view showing the overall arrangement of the heat pump heating-cooling system using a hybrid heat source in the present invention.

As shown in FIG. 1, the heat pump heating-cooling system using a hybrid heat source in the present invention can be used as a heating device for house in winter, while it can be used as a cooling device for house in summer. The generation of frost in evaporator can occur, when the heat pump system in the present invention is used as a heating device for house in winter.

The ambient temperature in winter can be declined into below −10° C. Further, the ambient temperature of evaporator can be declined into around −30° C. by absorbing the evaporation heat. Therefore, the generation of frost around evaporator cannot be avoided.

The features of the present invention can be described in that the evaporation thermal energy in the brine can be supplied into evaporator (D). At this time, 11~14° C. of brine can be supplied to the brine supplying pipe (C) to afford the evaporation thermal energy, while −3~5° C. of brine has been collected. Further, 11~14° C. of brine has been re-supplied and circulated after heat exchange with ground water in a brine heat exchanger (20). If the brine thermal energy is not sufficient from heat exchange with ground water, the inline heater thermal energy can be additionally provided to the brine.

Figure 2A:
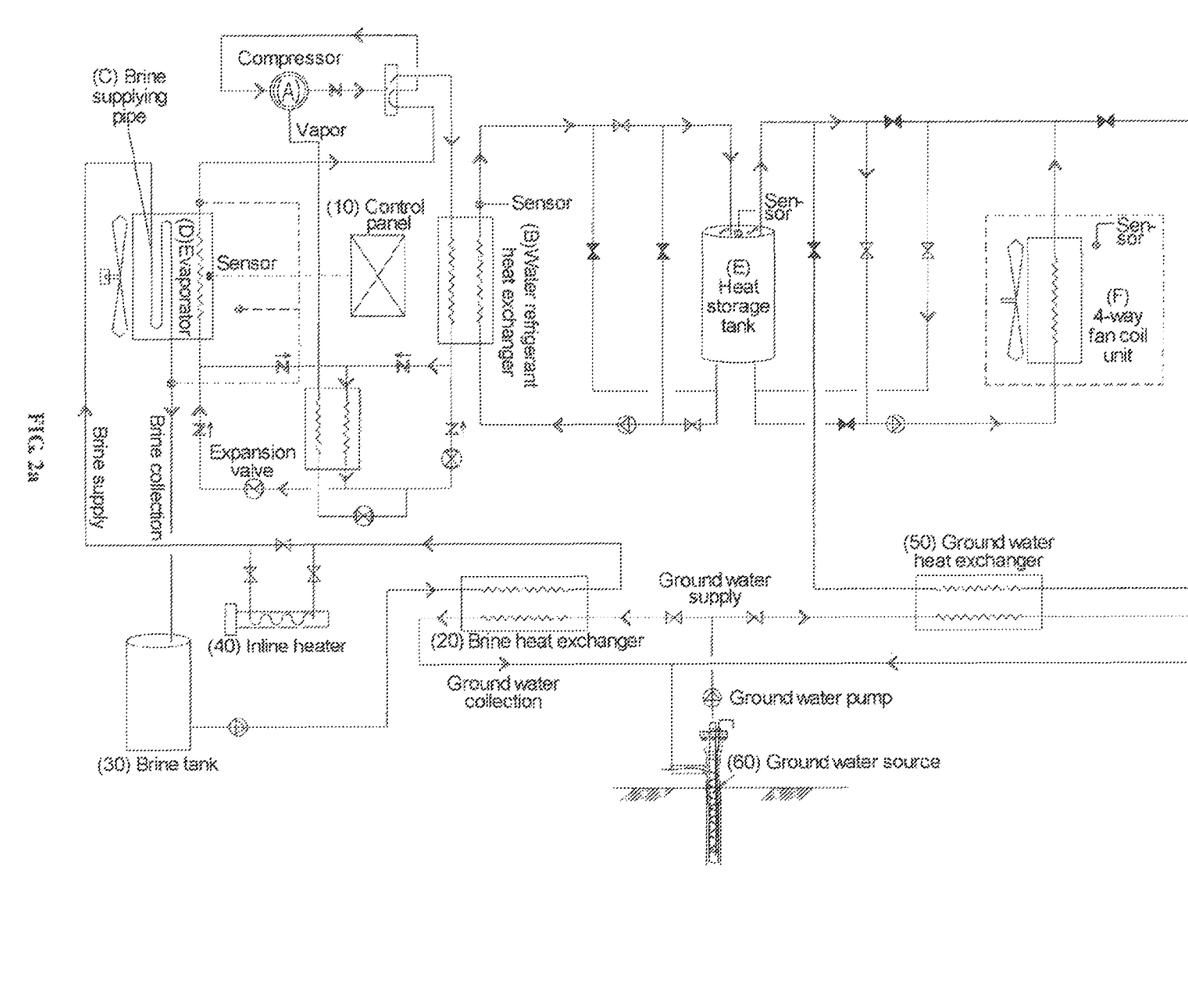
FIG. 2A is a schematic diagram showing the overall system of the heat pump heating system using a hybrid heat source in the present invention. In this diagram, the novel brine supply system including a brine heat exchanger (20), a brine tank (30) and a brine supplying pipe (C) has been illustrated. Further, an inline heater (40) for supplying thermal energy to the brine for defrosting has been also illustrated.
Figure 2B:
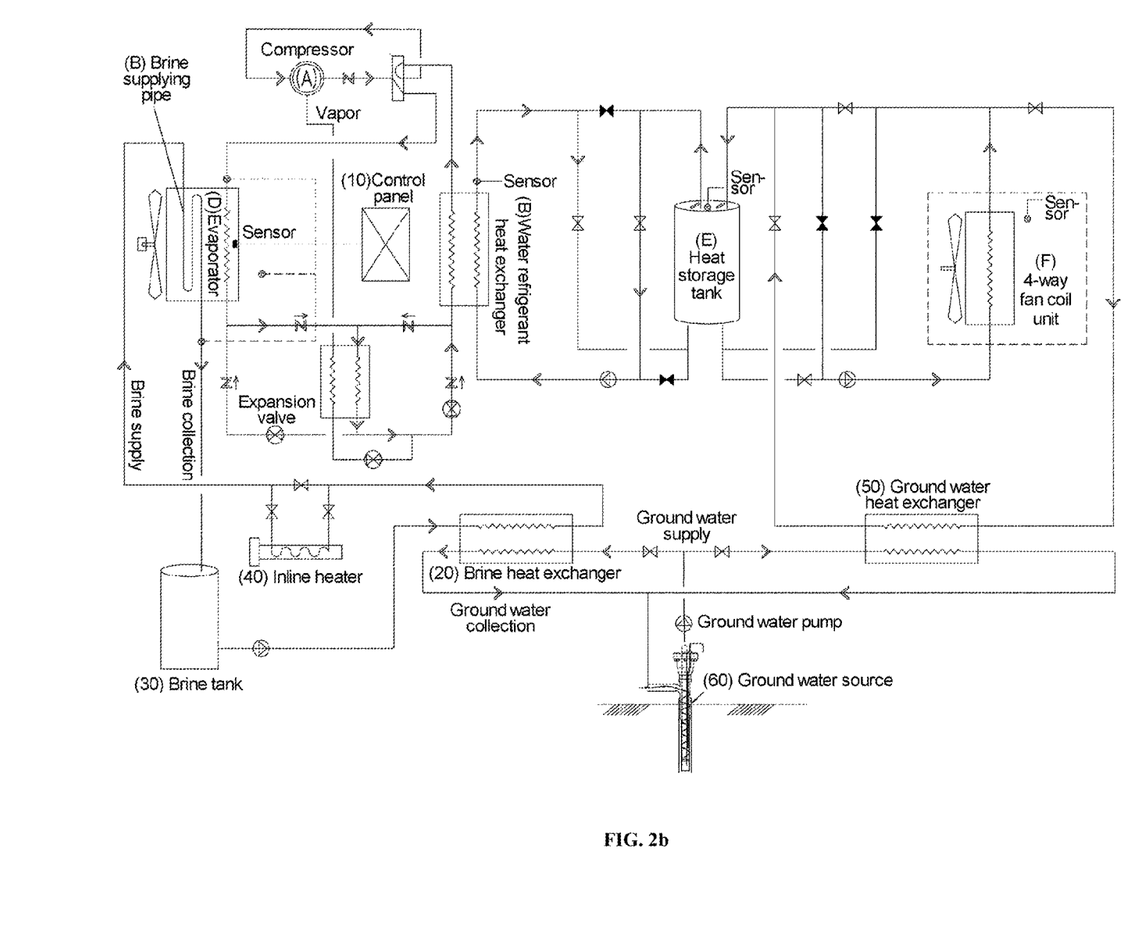
FIG. 2B is a schematic diagram showing the overall system of the heat pump cooling system using a hybrid heat source in the present invention. For cooling system, the refrigerant has been circulated in reverse direction of heating operation.

FIG. 2A and FIG. 2B are schematic diagrams showing the overall system of the heat pump heating-cooling system using a hybrid heat source in the present invention. In these diagrams, the novel brine supply system including a brine heat exchanger (20), a brine tank (30) and a brine supplying pipe (C) has been illustrated. Further, an inline heater (40) for supplying thermal energy to the brine for defrosting has been also illustrated.

As Shown in FIG. 2A and FIG. 2B, the heat pump heating-cooling system using a hybrid heat source in the present invention can be constructed by elemental part comprising: 1) a circulating energy source part for generating the thermal energy and transferring the thermal energy through the water-refrigerant heat exchanger (B) into a heat storage part, wherein a circulating energy source part comprises a compressor (A) for compressing the refrigerant, a condenser and water-refrigerant heat exchanger (B) for transferring the thermal energy into a heat storage part, a brine supplying pipe (C) for supplying thermal energy for both evaporation and defrost and an evaporator (D) for evaporating the refrigerant;

2) a heat storage part containing a heat storage tank (E);

3) a heat loading part to afford the heating to the green house through 4-way fan coil unit (F); and 4) a control panel (10) for controlling the operation conditions of normal and/or defrost mode operation.

The operation of the heat pump heating-cooling system using a hybrid heat source in the present invention has been controlled by control panel. In the control panel, the operation conditions have been controlled by processing the data detected by inlet/outlet a brine temperature sensor, an evaporator ambient temperature sensor, a frost detection sensor and/or a defrost temperature sensor.

According to the instruction from control panel, for heating operation, 11~14° C. of brine has been supplied to the brine supplying pipe (C) to afford evaporation heat and −3~5° C. of brine has been collected after supplying evaporation heat. Further, 8~14° C. of brine can be re-supplied and circulated after the heat exchange with ground water at a brine heat exchanger (20).

According to the instruction from control panel, for defrost operation, the operation of evaporator (D) is temporally suspended, 15~20° C. of brine heated by both the ground water heat from a brine heat exchanger (20) and the inline heater (40) heat is provided to the brine supplying pipe (C) installed in surroundings of evaporator to remove the frost outside of evaporator, and −3~5° C. of brine is discharged after defrost.

Further, the brine the normal mode or defrost mode of operation of the heat pump heating-cooling system can be decided by processing the data measured by a frost detection sensor, a temperature sensor, a pressure sensor and/or a gauge sensor in the control panel (10).

On the other hand, the brine used in the present invention has the freezing point of −30~−15° C. lower than water without toxicity. The preferred brine is mixed solution of water and anhydrous ethanol (1:1 v/v). If necessary, the mixed solution of water and calcium chloride can be available.

The thermal energy of brine can be supplied by the heat exchange of 13~15° C. of ground water collected from ground water source (60) in the brine heat exchanger (20). The ordinary brine temperature for heating in winter may be 8~14° C.

FIG. 2B is a schematic diagram showing the overall system of the heat pump cooling system using a hybrid heat source in the present invention. For cooling system, the refrigerant has been circulated in reverse direction of heating system.

The additional heat exchange made between 11~14° C. of ground water and 20° C. of cooling water has been made at the ground water heat exchanger (50) to supplement the cooling at loading place for cooling operation.

Figure 3A:
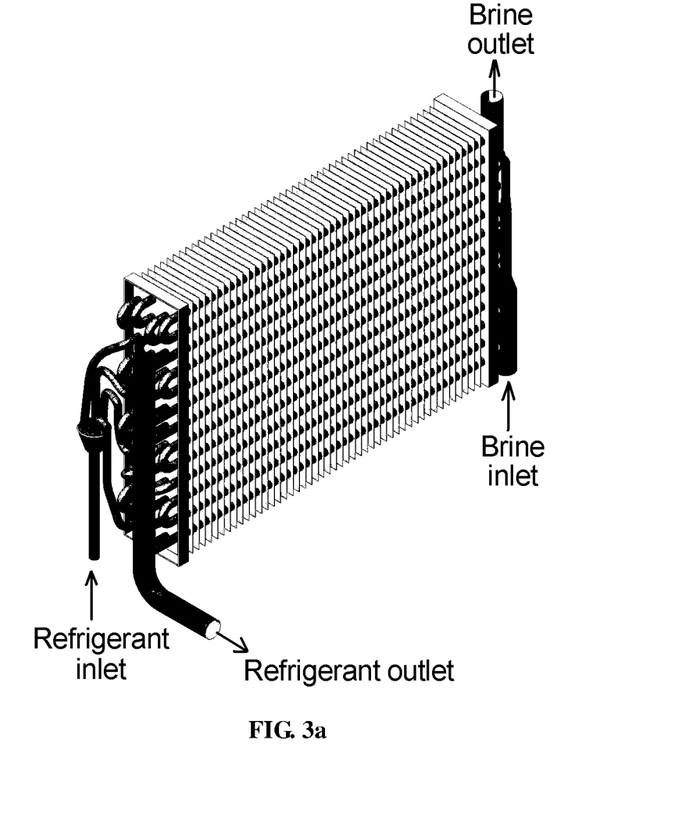
FIG. 3A is a 3-dimensional schematic view showing the structure of brine supplying pipes (C) and evaporating pipes (D) of the heat pump heating-cooling system using a hybrid heat source in the present invention.

FIG. 3A is a 3-dimensional schematic view showing the structure of brine supplying pipes (C) and evaporating pipes (D) of the heat pump heating-cooling system using a hybrid heat source in the present invention.

For heating operation, the liquid phase of refrigerant has been introduced to the evaporator and low temperature vapor phase refrigerant has been made after evaporation. To supply the evaporation heat, 11~14° C. of brine is supplied and −3~5° C. of brine is collected after supplying evaporation heat. The low temperature of brine has to be heat exchanged with ground water at a brine heat exchanger.

On the other hand, for cooling operation, the vapor phase of refrigerant has been introduced to the evaporator and high temperature liquid phase refrigerant has been made after liquefaction. The supplied brine can absorb the liquefaction heat from the evaporator.

Figure 3B:
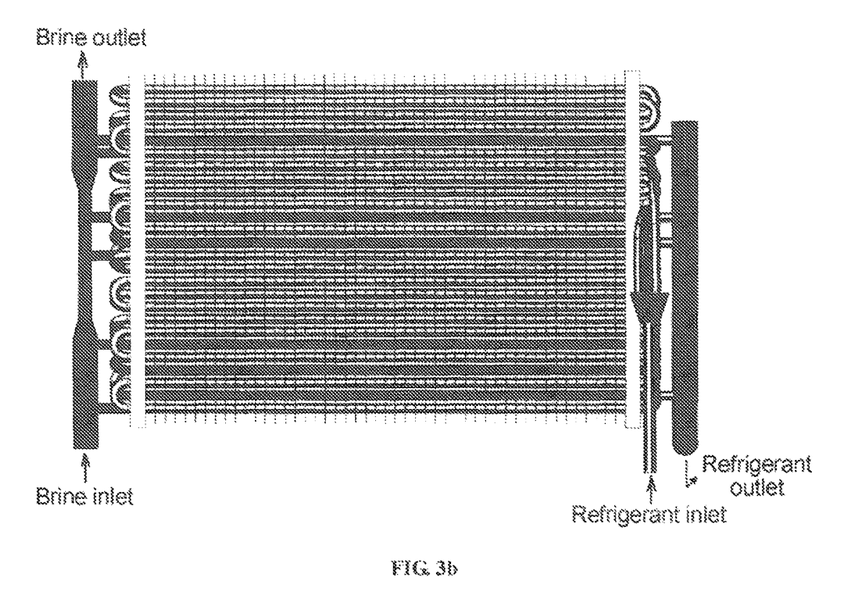
FIG. 3B is a plane schematic view showing the structure of brine supplying pipes (C) and evaporating pipes (D) of the heat pump heating-cooling system using a hybrid heat source in the present invention.

FIG. 3B is a plane schematic view showing the structure of brine supplying pipes (C) and evaporating pipes (D) of the heat pump heating-cooling system using a hybrid heat source in the present invention.

For heating operation, the liquid phase of refrigerant has been introduced to the evaporator and low temperature vapor phase refrigerant has been made after evaporation. To supply the evaporation heat, 11~14° C. of brine is supplied and −3~5° C. of brine is collected after supplying evaporation heat. The low temperature of brine has to be heat exchanged with ground water at a brine heat exchanger.

On the other hand, for cooling operation, the vapor phase of refrigerant has been introduced to the evaporator and high temperature liquid phase refrigerant has been made after liquefaction. The supplied brine can absorb the liquefaction heat from the evaporator.

For heating operation, the liquid phase of refrigerant has been introduced to the evaporator and low temperature vapor phase refrigerant has been made after evaporation. To supply the evaporation heat, 11~14° C. of brine is supplied and −3~5° C. of brine is collected after supplying evaporation heat. The low temperature of brine has to be heat exchanged with ground water at the brine heat exchanger (20).

In addition, the brine supplying pipes and the evaporation pipes have been arranged to be mixed each other in zigzag style and the fins have been equipped in equal spacing distance outside of brine supplying pipes and evaporation pipes for efficient heat exchange. Further, the 11~14° C. of brine is supplied to afford the evaporation heat during heating operation, while 8~14° C. of brine is supplied to absorb the liquefaction heat during cooling operation.

Figure 4A:
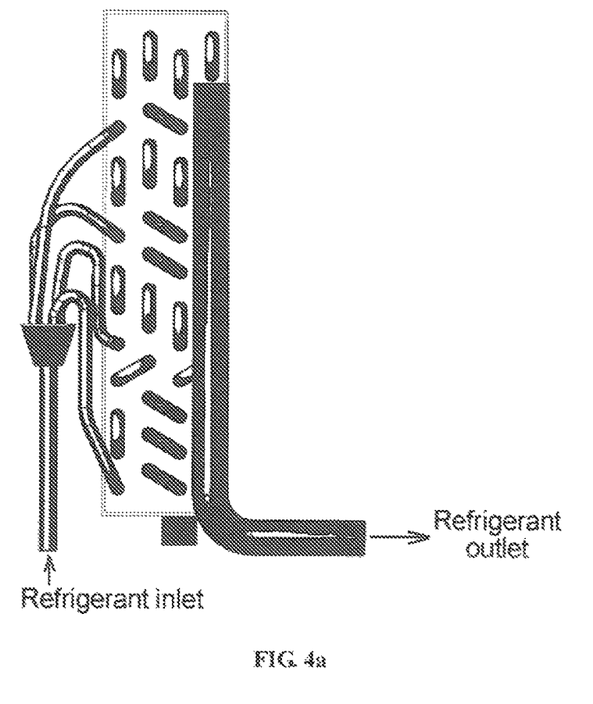
FIG. 4A is a detailed view showing the structure of brine supplying pipes and evaporating pipes in respect to the inlet and outlet of refrigerant in the heat pump heating-cooling system using a hybrid heat source in the present invention.

FIG. 4A is a detailed view showing the structure of brine supplying pipes and evaporating pipes in respect to the inlet and outlet of refrigerant in the heat pump heating-cooling system using a hybrid heat source in the present invention. In FIG. 4A, the bright color shows the pipe structure of evaporating pipes for refrigerant circulation and the dark color shows the pipe structure of brine supplying pipes for brine circulation. The inlet and outlet of refrigerant have been equipped to the outside of evaporator.

Figure 4B:
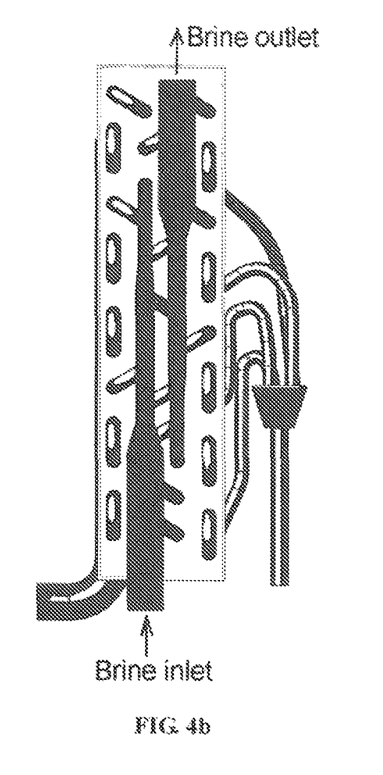
FIG. 4B is a detailed view showing the structure of brine supplying pipes and evaporating pipes in respect to the inlet and outlet of brine in the heat pump heating-cooling system using a hybrid heat source in the present invention.

FIG. 4B is a detailed view showing the structure of brine supplying pipes and evaporating pipes in respect to the inlet and outlet of brine in the heat pump heating-cooling system using a hybrid heat source in the present invention. In FIG. 4B, the bright color shows the pipe structure of evaporating pipes for refrigerant circulation and the dark color shows the pipe structure of brine supplying pipes for brine circulation. The inlet and outlet of brine have been equipped to the outside of evaporator.

Figure 4C:
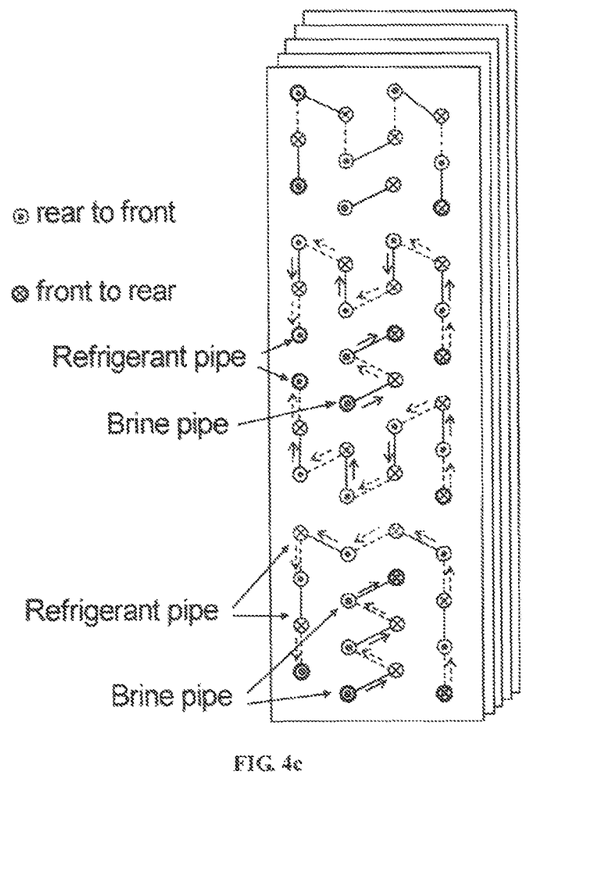
FIG. 4C is a detailed view showing the structure of brine supplying pipes and evaporating pipes in the heat pump heating-cooling system using a hybrid heat source in the present invention.

FIG. 4C is a detailed view showing the structure of brine supplying pipes and evaporating pipes in the heat pump heating-cooling system using a hybrid heat source in the present invention. In FIG. 4C, the outside surrounding pipes shows the evaporating pipes for refrigerant circulation and the inside core pipes shows the brine supplying pipes for brine circulation.

Further, for defrost the evaporator, the operation of evaporator (D) is temporally suspended, 15~20° C. of brine heated by both the ground water heat through a brine heat exchanger (20) and the inline heater (40) heat is provided to the brine supplying pipe (C) installed in surroundings of evaporator to remove the frost outside of evaporator, and −3~5° C. of brine is discharged after defrost.

Figure 5A:
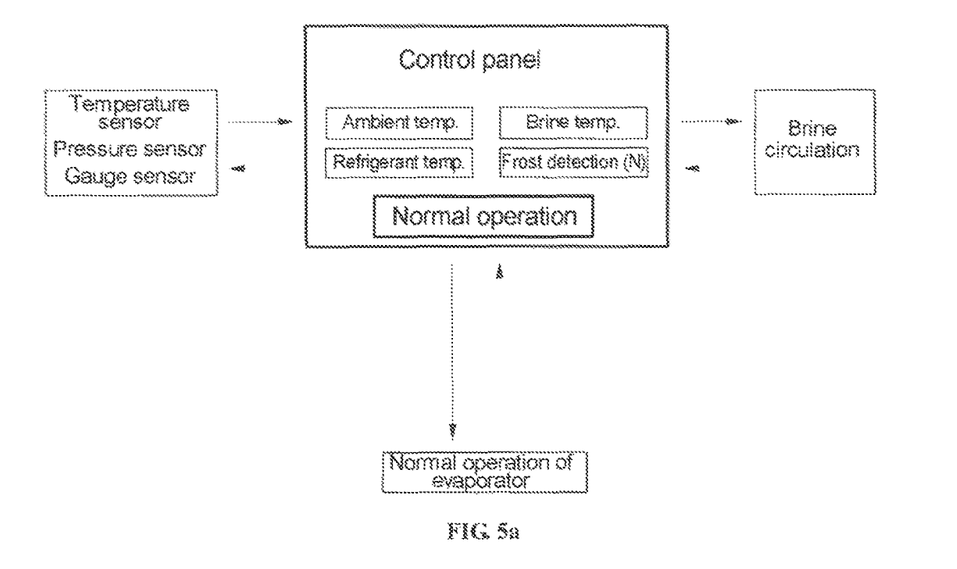
FIG. 5A is a view showing the normal mode operation in respect to control panel of the heat pump heating-cooling system using a hybrid heat source in the present invention.

FIG. 5A is a view showing the normal mode operation in respect to control panel of the heat pump heating-cooling system using a hybrid heat source in the present invention.

As shown in FIG. 5A, the data measured by a frost detection sensor, a temperature sensor, a pressure sensor and/or a gauge sensor have been processed in the control panel (10).

According to the instruction from control panel, for heating operation, the brine has been supplied to the brine supplying pipe (C) to afford evaporation heat and the brine has been collected after supplying evaporation heat. Further, the brine can be re-supplied and circulated after the heat exchange with ground water at a brine heat exchanger (20).

Figure 5B:
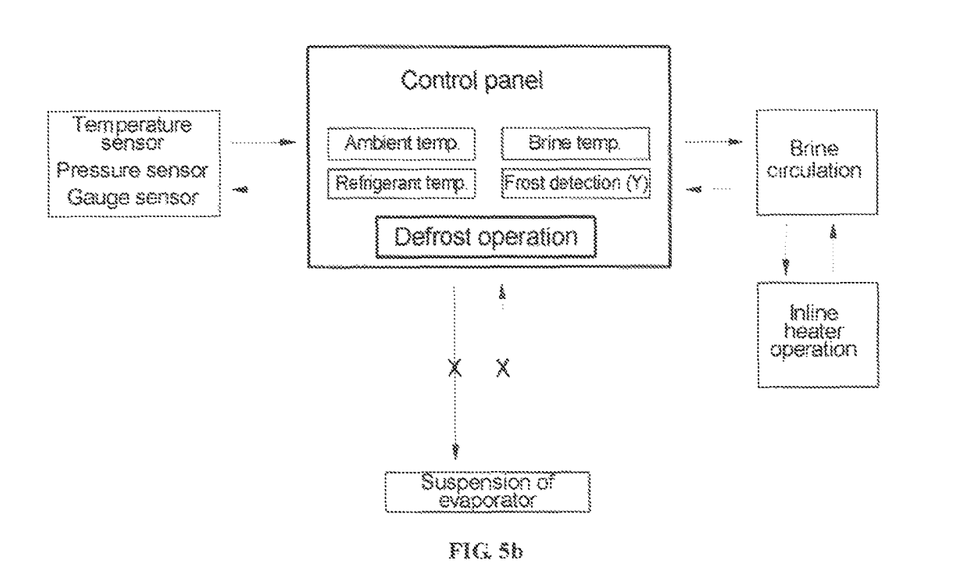
FIG. 5B is a view showing the defrost mode operation in respect to control panel of the heat pump heating-cooling system using a hybrid heat source in the present invention. The operation of evaporator has been temporally suspended and brine circulation and inline heater operation have been started for defrosting.

FIG. 5B is a view showing the defrost mode operation in respect to control panel of the heat pump heating-cooling system using a hybrid heat source in the present invention. In defrost mode operation, the operation of evaporator has been temporally suspended and brine circulation and inline heater operation have been started for defrosting.

As shown in FIG. 5B, after processing the data measured by a frost detection sensor, a temperature sensor, a pressure sensor and/or a gauge sensor in the control panel (10) for the defrost mode operation, the operation of evaporator (D) is temporally suspended, 15~20° C. of brine heated by both the ground water heat through a brine heat exchanger (20) and the inline heater (40) heat is provided to the brine supplying pipe (C) installed in surroundings of evaporator to remove the frost outside of evaporator, and −3~5° C. of brine is discharged after defrost.

Further, the normal mode operation or the defrost mode of operation can be decided by processing the data measured by a frost detection sensor, a temperature sensor, a pressure sensor and/or a gauge sensor in the control panel (10), after initial detection of the frost by the frost detection sensor.

Figure 6A:
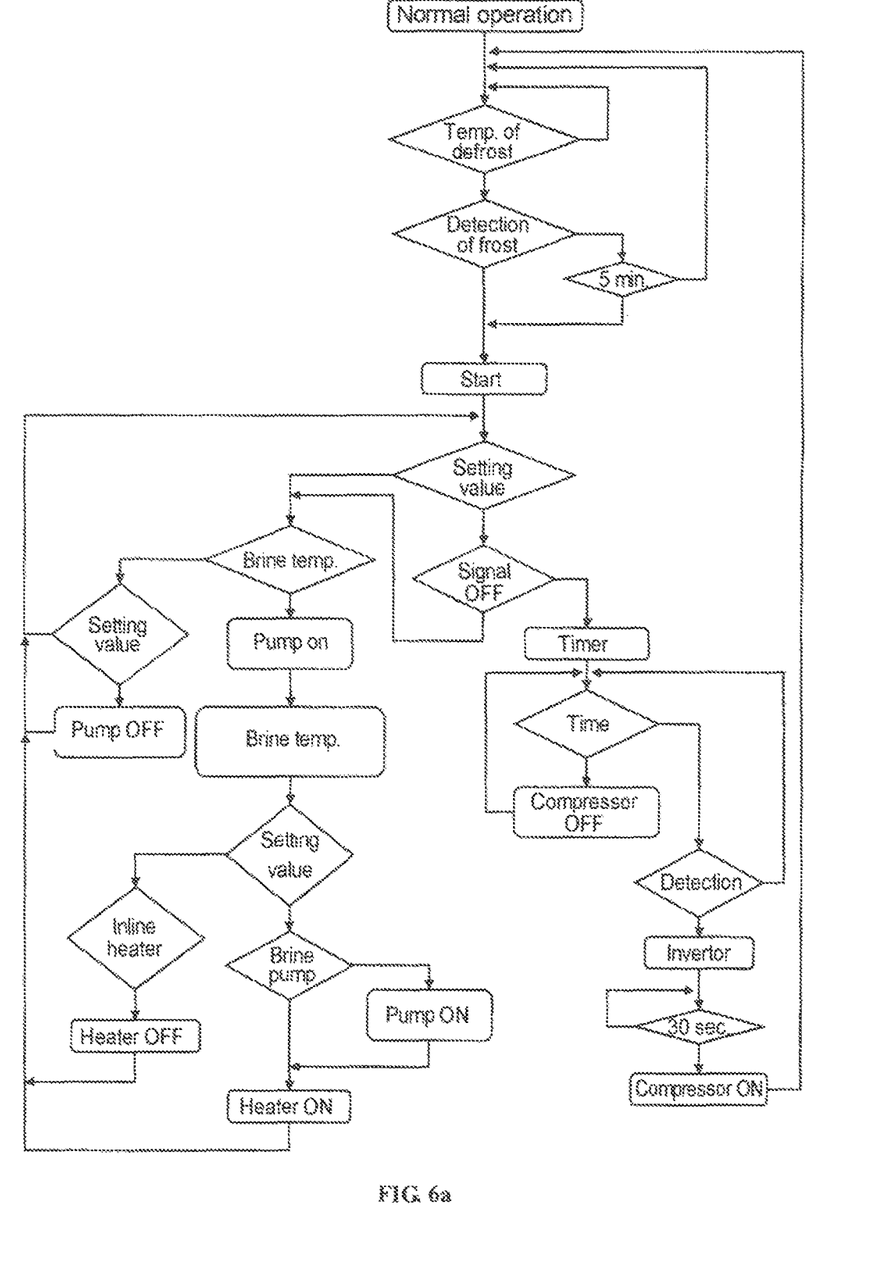
FIG. 6A is a flow chart for showing the start of defrost mode operation in the control panel of the heat pump heating-cooling system using a hybrid heat source in the present invention. In the defrost mode operation, defrost can be made using hybrid heat sources of air, ground water, brine and inline heater.

FIG. 6A is a flow chart for showing the start of defrost mode operation in the control panel of the heat pump heating-cooling system using a hybrid heat source in the present invention. In the defrost mode operation, defrost can be made using hybrid heat sources of air, ground water, brine and inline heater.

When an amount of frost has been detected by the frost detection sensor, the function of control panel has been initiated. According to the instruction from control panel, the temperature of brine becomes increased. By operating brine pump, 15~20° C. of heated brine has been supplied into the brine supplying pipe. If required, the inline heater becomes operated with the suspension of compressor.

Figure 6B:
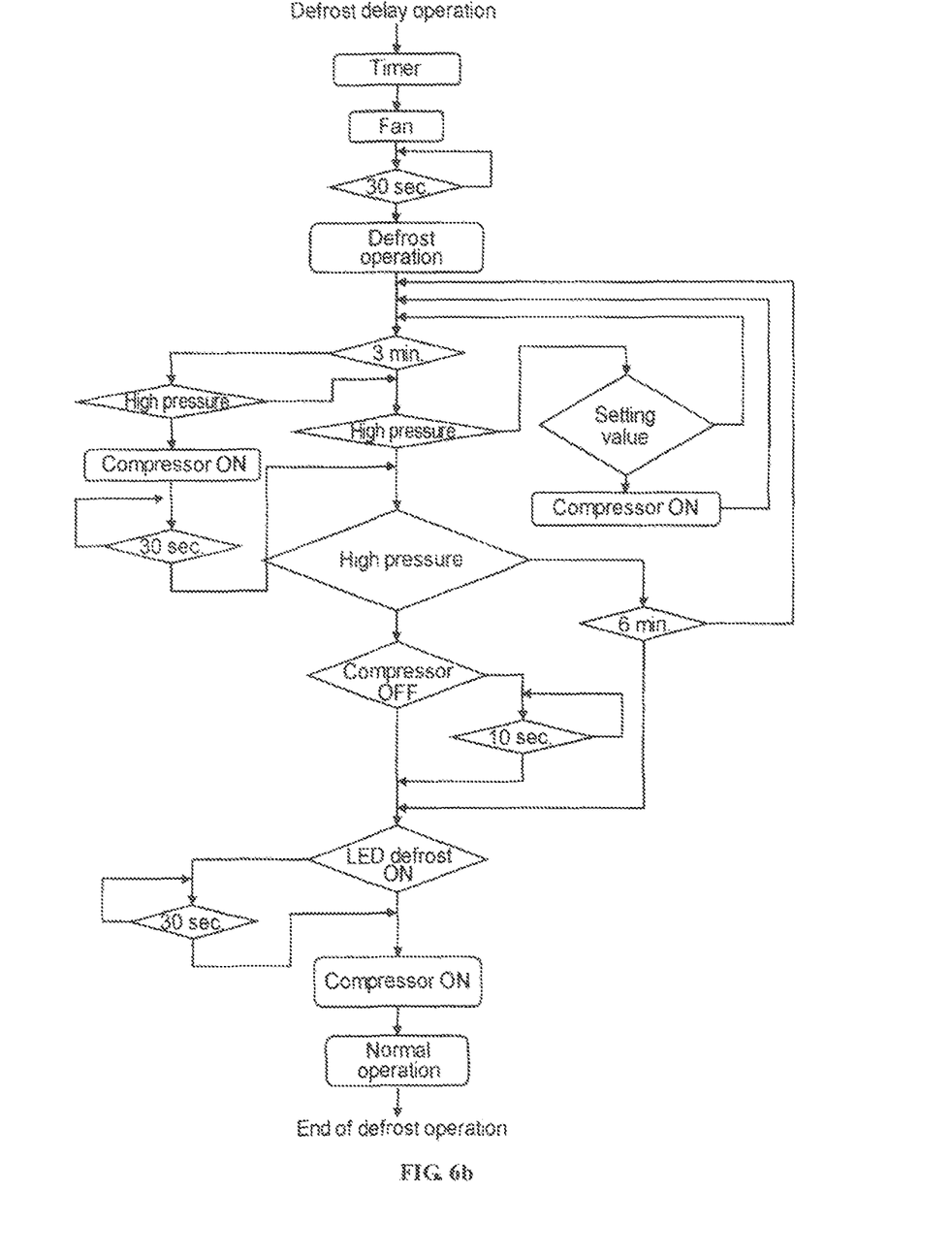
FIG. 6B is a flow chart for showing the defrost mode operation in the control panel of the heat pump heating-cooling system using a hybrid heat source in the present invention.

FIG. 6B is a flow chart for showing the defrost mode operation in the control panel of the heat pump heating-cooling system using a hybrid heat source in the present invention.

If the operation has been converted into defrost mode, the operation of compressor has been suspended. The evaporation in evaporator has been also suspended. The heated brine in the brine supplying pipe (C) has removed the frost outside of evaporator.

| Reference numeral | |
|---|---|
| 10. control panel | 20. Brine heat exchanger |
| 30. brine tank | 40. Inline heater |
| 50. ground water heat exchanger | 60. ground water source |

What is claimed is:

1. A heat pump heating-cooling system using hybrid heat sources of air, ground water, brine and an inline heater, comprising:
   1) a circulating energy source part for generating and transferring thermal energy through a water-refrigerant heat exchanger into a heat storage part, wherein the circulating energy source part comprises:
      a compressor for compressing a refrigerant,
      a condenser and water-refrigerant heat exchanger for transferring the thermal energy into the heat storage part,
      a brine supplying pipe for supplying thermal energy for both evaporation and defrost, and
      an evaporator for evaporating the refrigerant;
   2) the heat storage part containing a heat storage tank, wherein the thermal energy from the circulating energy source part is supplied and stored in a water medium;
   3) a 4-way fan coil unit, wherein the thermal energy in heated water is exchanged and released from the 4-way fan coil unit; and
   4) a control panel for controlling the operation conditions of normal and/or defrost mode operation;
   wherein 11~14° C. of brine is supplied to the evaporator to afford the evaporation thermal energy, −3~5° C. of brine is collected in the brine tank and 8~14° C. of brine is re-supplied and circulated after heat exchange with the ground water in a brine heat exchanger.

2. A heat pump heating-cooling system using hybrid heat sources of air, ground water, brine and an inline heater, comprising:
   1) a circulating energy source part for generating and transferring thermal energy through a water-refrigerant heat exchanger into a heat storage part, wherein the circulating energy source part comprises:
      a compressor for compressing a refrigerant,
      a condenser and water-refrigerant heat exchanger for transferring the thermal energy into the heat storage part,
      a brine supplying pipe for supplying thermal energy for both evaporation and defrost, and
      an evaporator for evaporating the refrigerant;
   2) the heat storage part containing a heat storage tank, wherein the thermal energy from the circulating energy source part is supplied and stored in a water medium;
   3) a 4-way fan coil unit, wherein the thermal energy in heated water is exchanged and released from the 4-way fan coil unit; and
   4) a control panel for controlling the operation conditions of normal and/or defrost mode operation;
   wherein, for the defrost mode operation, the operation of the evaporator is temporally suspended, 15~20° C. of brine heated by both the ground water heat through a brine heat exchanger and the inline heater is provided to the brine supplying pipe installed in surroundings of the evaporator to remove the frost outside of the evaporator, and −3~5° C. of brine is discharged after defrost.

3. The heat pump heating-cooling system using hybrid heat sources according to claim 1, wherein the normal mode or the defrost mode of operation is decided by processing data measured by a frost detection sensor, a temperature sensor, a pressure sensor and/or a gauge sensor in the control panel, after initial detection of frost by the frost detection sensor.

4. The heat pump heating-cooling system using hybrid heat sources according to claim 1,
wherein the brine supplying pipe and an evaporation pipe are arranged to be mixed with each other in zigzag style and fins are equipped in equal spacing distance outside of the brine supplying pipe and the evaporation pipe for efficient heat exchange; and
wherein the 11~14° C. of brine is supplied to afford evaporation heat during heating operation and 8~14° C. of brine is supplied to absorb liquefaction heat during cooling operation.

5. The heat pump heating-cooling system using hybrid heat sources according to claim 1,
wherein the freezing point of the brine is −30~−15° C. and the brine is a mixed solution of water and anhydrous ethanol.

6. The heat pump heating-cooling system using hybrid heat sources according to claim 2,
wherein the normal mode or the defrost mode of operation is decided by processing data measured by a frost detection sensor, a temperature sensor, a pressure sensor and/or a gauge sensor in the control panel, after initial detection of frost by the frost detection sensor.

7. The heat pump heating-cooling system using hybrid heat sources according to claim 2,
wherein the freezing point of the brine is −30~−15° C. and the brine is a mixed solution of water and anhydrous ethanol.

* * * * *